(12) United States Patent
Maurer et al.

(10) Patent No.: US 7,135,503 B1
(45) Date of Patent: Nov. 14, 2006

(54) METHOD FOR RECLAIMING POLYESTER OR POLYESTER MIXTURES

(75) Inventors: Andreas Maurer, Freising (DE); Udo Knauf, München (DE); Thomas Luck, München (DE)

(73) Assignee: Fraunhofer-Gesellschaft zur Forderung der Angewandten Forschung E.V. (DE)

( * ) Notice: Subject to any disclaimer, the term of this patent is extended or adjusted under 35 U.S.C. 154(b) by 297 days.

(21) Appl. No.: 10/130,496

(22) PCT Filed: Oct. 27, 2000

(86) PCT No.: PCT/EP00/10600

§ 371 (c)(1),
(2), (4) Date: Aug. 26, 2002

(87) PCT Pub. No.: WO01/36523

PCT Pub. Date: May 25, 2001

(30) Foreign Application Priority Data

Nov. 18, 1999 (DE) ................................ 199 55 495
Apr. 5, 2000 (DE) ................................ 100 17 707

(51) Int. Cl.
*C08J 11/04* (2006.01)
(52) U.S. Cl. .......................................... 521/40; 521/48
(58) Field of Classification Search .................. 521/40, 521/48
See application file for complete search history.

(56) References Cited

U.S. PATENT DOCUMENTS

| 4,078,916 A | | 3/1978 | Gerber et al. ................... 75/83 |
| 4,517,312 A | * | 5/1985 | Kumasaka et al. ............ 521/47 |
| 5,328,982 A | * | 7/1994 | Tindall et al. ............... 528/488 |
| 5,554,657 A | * | 9/1996 | Brownscombe et al. ....... 521/48 |
| 5,776,989 A | | 7/1998 | Kubota et al. ................. 521/48 |
| 5,866,622 A | | 2/1999 | Everhart et al. .............. 521/48 |
| 6,287,680 B1 | * | 9/2001 | Sasaki et al. ............. 438/317.9 |
| 6,291,574 B1 | * | 9/2001 | Gallucci ..................... 524/505 |

FOREIGN PATENT DOCUMENTS

| DE | 197 32 673 A1 | 2/1999 |
| EP | 0 707 043 A1 | 4/1995 |
| EP | 0 850 982 A2 | 7/1998 |

* cited by examiner

*Primary Examiner*—Tae H. Yoon
(74) *Attorney, Agent, or Firm*—Young & Basile, P.C.

(57) ABSTRACT

The invention relates to a method for reclaiming polyesters or polyester mixtures from polyester or waste containing polyester. The aim of the invention is to reclaim polyesters or polyester mixtures of good quality in a cost-effective manner. To achieve this aim, the polyester and/or waste containing polyester is heated in a bath of dicarboxylic acid dialkyl ester to temperatures in excess of 150° C. In this process, polyester is dissolved in the dicarboxylic acid dialkyl ester or a dicarboxylic acid dialkyl ester mixture and subsequently extracted from the solution by means of solid-liquid separation.

12 Claims, 2 Drawing Sheets

METHOD FOR RECLAIMING POLYESTER OR POLYESTER MIXTURES

The invention relates to a method of reclaiming polyesters or polyester mixtures from polyester or waste containing polyester. Polyesters have proved to be particularly suitable plastics materials for many applications. Thus they are used in the food industry as packaging or for containers. Another important field of use for polyester plastics is in printed circuit boards for the electronics industry.

Since high quality requirements are set for the recycling of plastics from polyester limits have been set on recycling by the achievable quality or the financial outlay for reprocessing. Cost and quantity are affected by waste guided in the recycling circuit, which is partially printed, has labels glued to it or is contained in the form of composite materials, as in the case of printed circuit boards.

The object of the invention, therefore, it to propose a possible way of reclaiming polyesters or polyester mixtures of a good quality in a cost-effective manner, thus saving natural resources.

This object is accomplished according to the invention with the features of claim 1. Advantageous embodiments and developments of the invention arise with the features mentioned in the subordinate claims.

In the method according to the invention for reclaiming polyesters or polyester mixtures from polyester or waste containing polyester, the procedure is that the corresponding pre-sorted waste is heated up in a bath of dicarboxylic acid dialkyl ester, the polyester portions being dissolved at a temperature in excess of 150° C., preferably in excess of 180° C., and by very particular preference just below the boiling point of dicarboxylic acid dialkyl ester or a dicarboxylic acid dialkyl ester mixture, said boiling point lying at approx. 210°.

In this process, the waste should be previously cleaned and rid of impurities, it being possible to carry out sieving and/or washing possibly with heavy-liquid separation.

It is also advantageous to comminute the waste mechanically before the dissolving process, such that the surface conditions for dissolving are improved.

A particularly suitable dicarboxylic acid dialkyl ester mixture has proved to be the one which is commercially available from the company DuPont under the designation DBE.

The dissolved polyesters can be separated from the dicarboxylic acid dialkyl ester solution by mechanical and/or thermal solid-liquid separation. This can be solely a matter of a conventional precipitation.

However, it is more propitious to heat the dicarboxylic acid dialkyl ester or a dicarboxylic acid dialkyl ester mixture further up to above the boiling point and to evaporate it such that the polyester can be obtained by drying.

Naturally, a combination of precipitation and evaporation can also be used. Moreover, other solid, i.e. not soluble in dicarboxylic acid dialkyl ester, elements and compounds can be separated by means of precipitation.

Such separation can be achieved for example, in an adsorptive manner by filtering or by separation in the centrifugal field.

By means of the method according to the invention it is moreover possible to reclaim plastics other than polyesters by dissolving in dicarboxylic acid dialkyl ester. These can be polyolefins which go into solution and are separated in preliminary stages during which lower temperatures for dissolving are maintained.

The separation of polyester can also be carried out selectively following the separation of the other types of plastics or respectively also of other substances soluble in dicarboxylic acid dialkyl ester.

In the method according to the invention it is also very advantageous that the consumption of fresh dicarboxylic acid dialkyl ester is reduced by the recycling of the evaporated and then condensed dicarboxylic acid dialkyl ester.

Besides the DBE already mentioned, other dicarboxylic acid dialkyl esters or dicarboxylic acid dialkyl ester mixtures can also be used, e.g. diethyl esters or dimethyl esters of oxalic acid, malonic acid, succinic acid, glutaric acid and/or adipic acid.

Suitable polyesters for reclaiming are polyethylene terephthalate (PET) and/or polybutylene terephthalate (PBT).

If the reclaimed polyesters are to be used again, for example in the food industry for packaging purposes or as drinks receptacles, the solid-liquid separation should be carried out at least for so long that the proportion of dicarboxylic acid dialkyl ester is kept below 15 ppm.

If pure dicarboxylic acid dialkyl ester (DBE) is used to dissolve the plastics, a proportion of up to 20% polyester can be contained in the solution. For certain applications, however, solutions of dicarboxylic acid dialkyl ester or corresponding emulsions in which dicarboxylic acid dialkyl ester is contained can be used advantageously.

With the invention, the costs for the polyester recyclate obtained can be reduced by up to 50% in comparison with the corresponding new product.

The polyester portions of waste in the form of composite materials such as metallized polyethylene terephthalate foils as well as waste contaminated in some other way, covered with adhesive or printed, can also be processed according to the invention and the metals be reclaimed in addition to the metals polyester.

In the method according to the invention it is moreover advantageous that additional precipitation agents can be dispensed with and no second liquid or even additional gas phase arises and consequently no special precipitation apparatus and no energy- and cost-intensive reprocessing of solvent and precipitation agent is necessary.

In tests, PET waste (shredded soft drink bottles) as well as flexible printed circuit boards and copper-coated PET foil were used at different S/L ratios and kept at different temperature/time loads. No significant increase in oligomers was noted by means of HPLC/MS measurements. With the aid of high-temperature headspace gas chromatography (HS-GC), a rise in the proportion of acetaldehyde was noted, but otherwise no change and no transesterification, which has a negative effect on the properties of polyesters was noted.

The PET recyclate obtained had a slightly reduced glass-transition temperature TG of 80° C. by comparison with original PET.

Mechanical properties of PET recyclate are noted in the following table:

| Sample | Tear strength (N/mm$^2$) Average value | Breaking elongation (%) Average value |
| --- | --- | --- |
| DBE recyclate | 8.0 | 12.5 |
| PET flakes amorph* | 58.6 | 4.6 |

-continued

| Sample | Tear strength (N/mm²) Average value | Breaking elongation (%) Average value |
|---|---|---|
| PET flakes crystalline | 18.0 | 1.0 |

*amorph = semicrystalline (transparent) PET

The method according to the invention will be explained in greater detail below.

Figure 1:
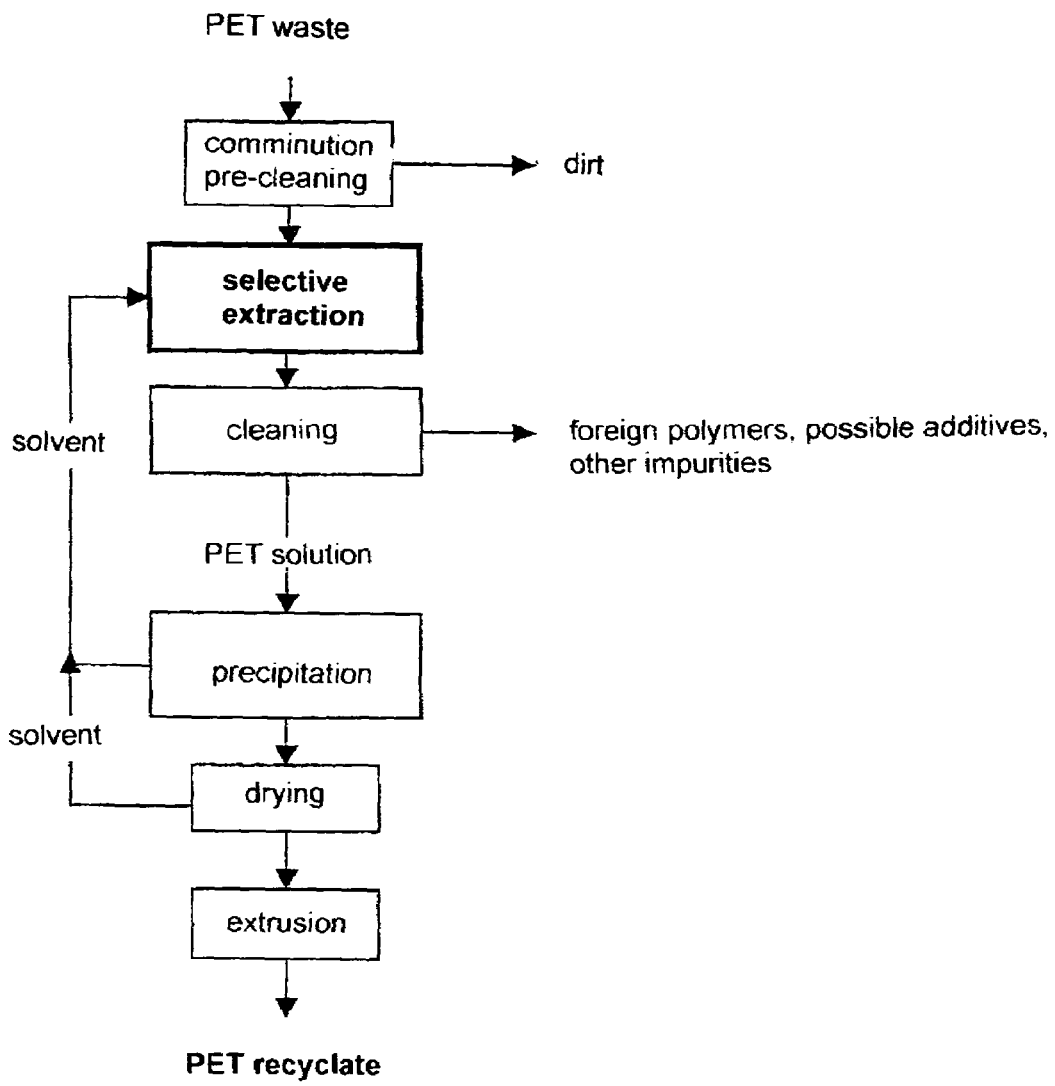
FIG. 1 an example of process management for reclaiming PET waste.

In the process sequence schematically represented in FIG. 1 for an example of a procedure according to the invention, the occurring and collected PET waste, is comminuted and pre-cleaned in a first step. During the pre-cleaning, removal of detached metal parts, sieving, washing and also heavy-liquid separation can be carried out.

The shredded waste thus prepared is dissolved in a preliminary stage in dicarboxylic acid dialkyl ester (DBE) at relatively low temperatures which are insufficient to dissolve polyester. In the next step, these components, for example other polymers, additives or other interfering substances are separated by solid-liquid separation, and possibly removed dicarboxylic acid dialkyl ester can be replaced again. After further heating, PET can dissolve in dicarboxylic acid dialkyl ester. This solution, which is rich in solids, is then subjected to precipitation by lowering the temperature <150° C., excess dicarboxylic acid dialkyl ester being removed in this process and returned to the preliminary or secondary stage described above or in place of the dicarboxylic acid dialkyl ester removed in the preliminary stage.

After the precipitation, the polyester is dried, i.e. it is heated further possibly at a reduced pressure until the boiling point of dicarboxylic acid dialkyl ester is exceeded. The gaseous dicarboxylic acid dialkyl ester can also be recycled after condensation.

The various method steps can be carried out in different reaction vessels which can be particularly advantageously designed for the respective application.

The dried PET can be subsequently extruded and further processed as PET recyclate.

Figure 2:
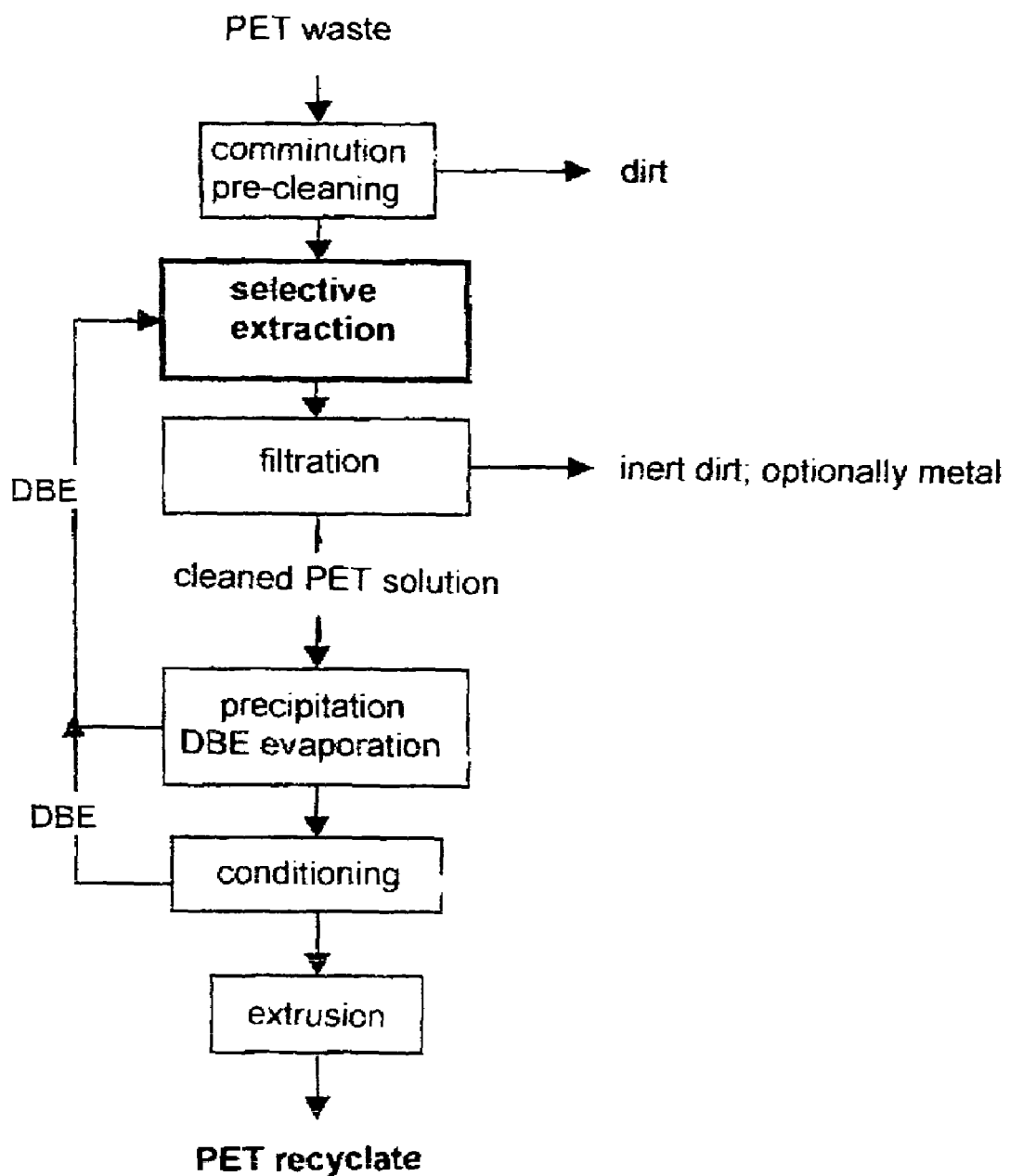
FIG. 2 a second process sequence for reclaiming polyesters from PET waste.

The example according to FIG. 2 differs from the example according to FIG. 1 in that the PET solution is cleaned by filtration, during which inert dirt, cardboard, paper residues and metals are removed, before precipitation and evaporation (e.g. spray drying). As a supplement to the drying step conditioning also takes place before the dried PET of improved quality can be used again.

In this example, too, the excess DBE occurring in various method steps is recycled.

The invention claimed is:

1. Method for reclaiming polyesters or polyester mixtures from polyester waste or waste containing polyester, the steps comprising: heating at least one of polyester and waste containing polyester in a bath of solvent of dicarboxylic acid dialkyl ester to temperatures in excess of 150° C., dissolving the polyester in the dicarboxylic acid diallyl ester selected from the dialkyl esters of oxalic acid, malonic acid, succinic acid, glutaric acid and adipic acid, and extracting the polyester from the solution by means of solid-liquid separation.

2. Method according to claim 1, characterised in that the separation of polyester and solvent is achieved by at least one of precipitation and evaporation of dicarboxylic acid dialkyl ester.

3. Method according to claim 1, characterised in that the separation is carried out at a lowered temperature.

4. Method according to claim 1, characterised in that dicarboxylic acid dialkyl ester containing polyester in dissolved form evaporates at temperatures in excess of 205° C. and the condensed gas phase is returned to a bath.

5. Method according to claim 1, characterised in that impurities are separated from the solution by means of solid-liquid separation.

6. Method according to claim 5 characterised in that the solution is filtered or separated in the centrifugal field.

7. Method according to claim 1, characterised in that additional constituents of the waste which are soluble in dicarboxylic acid dialkyl ester are extracted separately in preliminary stages.

8. Method according to claim 7, further comprising the step of separating polyolefins or polystyrene dissolved in dicarboxylic acid dialkyl ester in a preliminary stage.

9. Method according to claim 1, characterised in that the waste is comminuted before being made into a solution.

10. Method according to claim 1, characterised in that waste containing at least one of polyethylene terephthalate (PET) and polybutylene terephthalate (PMT) is used.

11. Method according to claim 1, characterised in that the solid-liquid separation is carried out so far that a proportion of dicarboxylic acid dialkyl ester <15 ppm is kept in the polyester obtained.

12. Method according to claim 1, characterised in that the dissolving of polyester in dicarboxylic acid dialkyl ester and the solid-liquid separation are carried out in separate reactors.

* * * * *

UNITED STATES PATENT AND TRADEMARK OFFICE
CERTIFICATE OF CORRECTION

PATENT NO. : 7,135,503 B1 Page 1 of 1
APPLICATION NO. : 10/130496
DATED : November 14, 2006
INVENTOR(S) : Andreas Maurer, Udo Knauf and Thomas Luck It is certified that error appears in the above-identified patent and that said Letters Patent is hereby corrected as shown below:

Column 4, Line 13; Delete "diallyl" and insert -- dialkyl --

Signed and Sealed this

Fifteenth Day of June, 2010

David J. Kappos
*Director of the United States Patent and Trademark Office*